United States Patent
Chen et al.

(10) Patent No.: US 10,955,288 B2
(45) Date of Patent: Mar. 23, 2021

(54) CROSS-SENSOR STANDARDIZATION

(71) Applicant: Halliburton Energy Services, Inc., Houston, TX (US)

(72) Inventors: Dingding Chen, Tomball, TX (US); David L. Perkins, The Woodlands, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 16/213,880

(22) Filed: Dec. 7, 2018

(65) Prior Publication Data
US 2019/0107434 A1 Apr. 11, 2019

Related U.S. Application Data

(62) Division of application No. 14/648,649, filed as application No. PCT/US2013/076660 on Dec. 19, 2013, now abandoned.

(51) Int. Cl.
*E21B 41/00* (2006.01)
*G01J 1/02* (2006.01)
(Continued)

(52) U.S. Cl.
CPC .......... *G01J 1/0295* (2013.01); *E21B 41/00* (2013.01); *E21B 47/135* (2020.05); *G01D 18/002* (2013.01)

(58) Field of Classification Search
CPC ...... G01J 1/0295; E21B 41/00; E21B 47/123; G01D 18/002
See application file for complete search history.

(56) References Cited

U.S. PATENT DOCUMENTS 7,061,061 B2 * 6/2006 Goodman ............ G01N 27/128
257/414
9,347,314 B2 * 5/2016 Indo ...................... E21B 47/113
(Continued)

FOREIGN PATENT DOCUMENTS

WO  WO 2013/089764    * 6/2013
WO     2014137354      9/2014
WO  WO2015094303 A1   6/2015

OTHER PUBLICATIONS

International Search Report and Written Opinion of PCT Application No. PCT/US2013/076660 dated Sep. 17, 2014: pp. 1-10.
(Continued)

*Primary Examiner* — Gregory J Toatley, Jr.
*Assistant Examiner* — Lynda Dinh
(74) *Attorney, Agent, or Firm* — Chamberlain Hrdlicka

(57) ABSTRACT

The disclosed embodiments include a method, apparatus, and computer program product for generating a cross-sensor standardization model. For example, one disclosed embodiment includes a system that includes at least one processor; at least one memory coupled to the at least one processor and storing instructions that when executed by the at least one processor performs operations comprising selecting a representative sensor from a group of sensors comprising at least one of same primary optical elements and similar synthetic optical responses and calibrating a cross-sensor standardization model based on a matched data pair for each sensor in the group of sensors and for the representative sensor. In one embodiment, the at least one memory coupled to the at least one processor and storing instructions that when executed by the at least one processor performs operations further comprises generating the matched data pair, wherein the matched data pair comprises calibration input data and calibration output data.

18 Claims, 6 Drawing Sheets

(51) Int. Cl.
*E21B 47/135* (2012.01)
*G01D 18/00* (2006.01)

(56) References Cited

U.S. PATENT DOCUMENTS

| | | |
|---|---|---|
| 2007/0032896 A1 | 2/2007 | Ye et al. |
| 2007/0035712 A1 | 2/2007 | Gassner et al. |
| 2007/0104353 A1 | 5/2007 | Vogel |
| 2009/0009766 A1 | 1/2009 | Bonino et al. |
| 2011/0054864 A1* | 3/2011 | Lundstedt ............ G01N 21/274 703/2 |
| 2013/0271628 A1 | 10/2013 | Ku et al. |
| 2013/0312481 A1* | 11/2013 | Pelletier ................. E21B 49/08 73/1.02 |
| 2015/0160367 A1* | 6/2015 | Le .......................... E21B 49/00 324/339 |
| 2015/0226063 A1* | 8/2015 | Zuo ........................ E21B 49/08 702/11 |
| 2015/0369656 A1 | 12/2015 | Chen et al. |

OTHER PUBLICATIONS

PCT Application No. PCT/US2014/013192 filed Jan. 27, 2014: pp. 1-31.

* cited by examiner

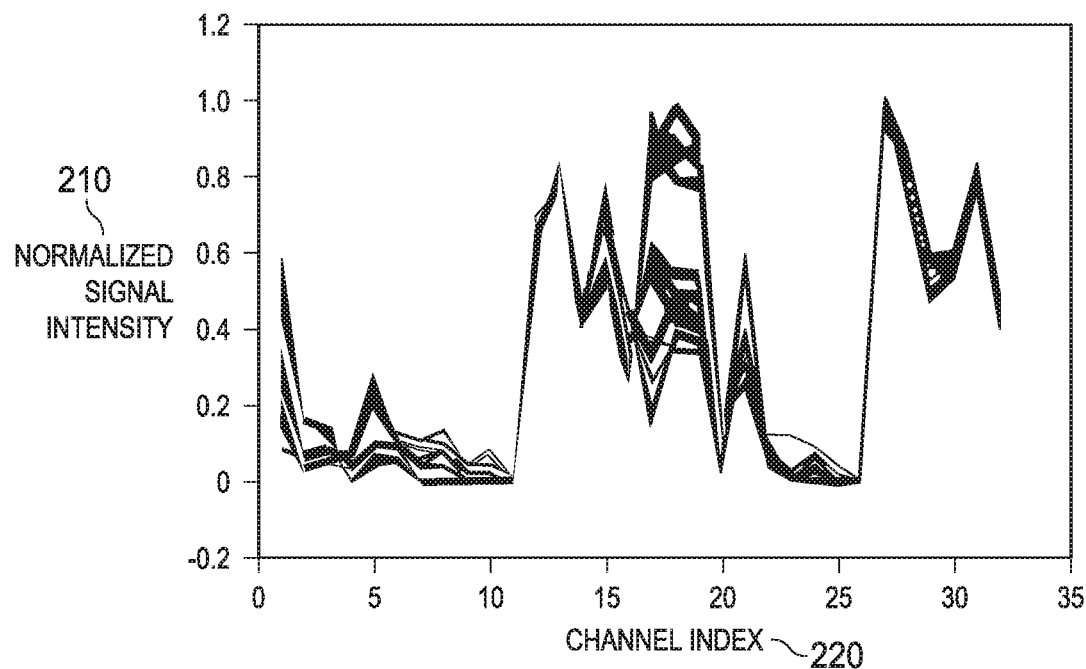
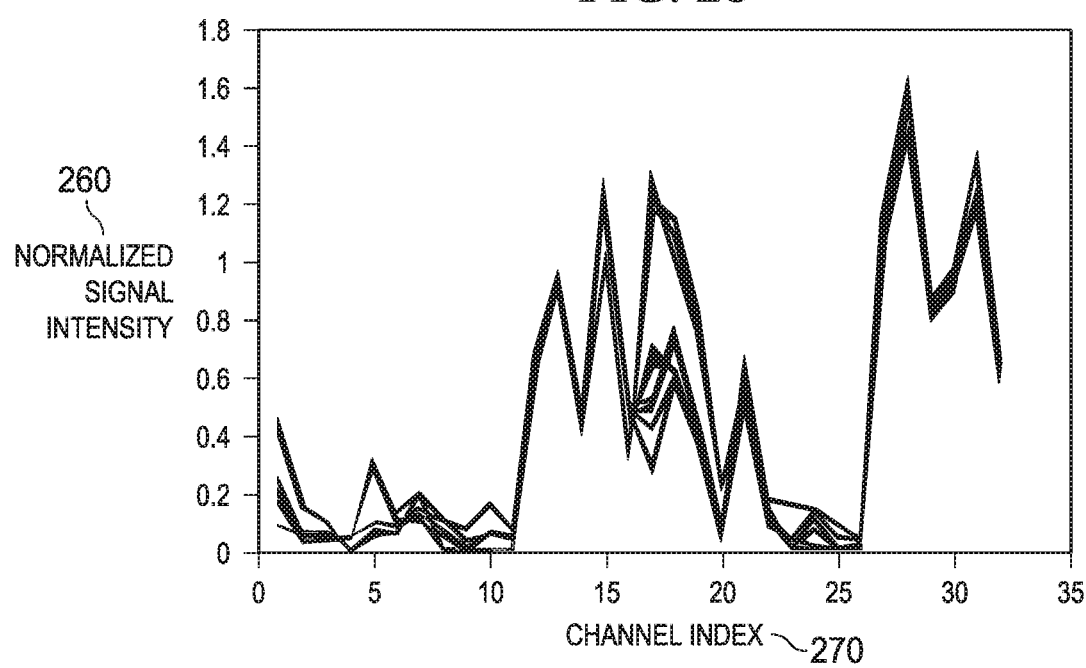

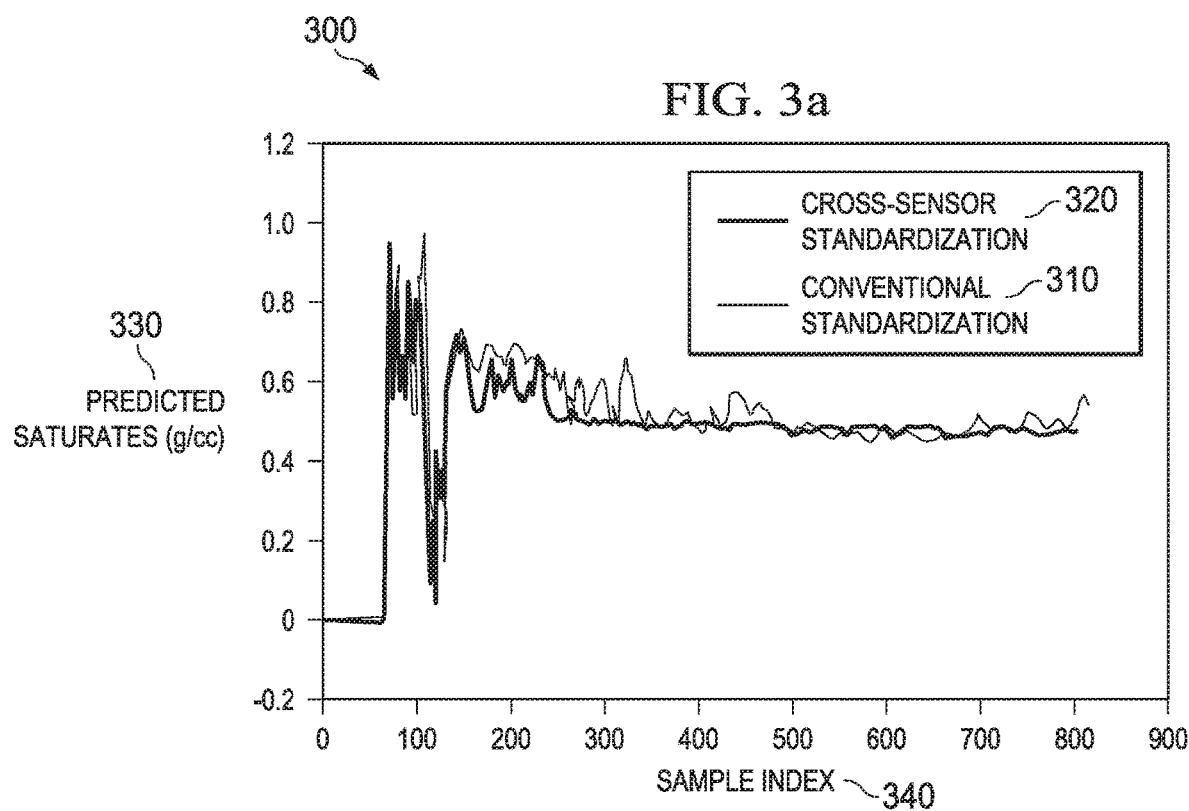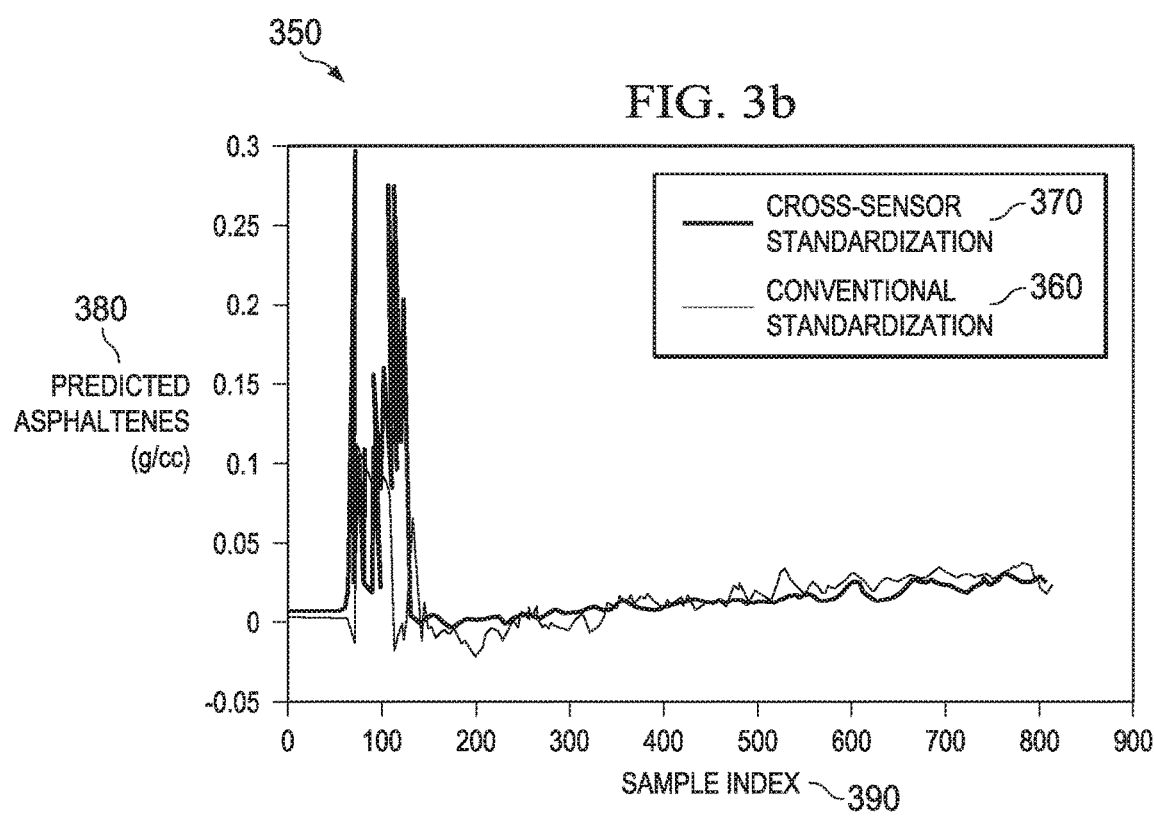

CROSS-SENSOR STANDARDIZATION

BACKGROUND OF THE INVENTION

Various multivariate models are used to predict chemical compositions and other properties of unknown reservoir fluid samples during formation fluid analysis that are based on the measurements of downhole optical tools. The application of pre-calibrated fluid prediction models is tool dependent, often requiring data standardization or transformation to convert measured sensor responses from the tool data space to the calibration data space. The costs associated with fluid prediction model development and management affects how instrument standardization is performed.

BRIEF DESCRIPTION OF THE DRAWINGS

Illustrative embodiments of the present invention are described in detail below with reference to the attached drawing figures, which are incorporated by reference herein and wherein:

FIGS. 2a and 2b are graphs illustrating calibration pairs across 32 channels of a sensor used to build multivariate models using a cross-sensor standardization approach, in accordance with the disclosed embodiments;

FIGS. 3a and 3b are graphs illustrating the results of applying a cross-sensor standardization model, in accordance with the disclosed embodiments;

DETAILED DESCRIPTION

Figure 1A:
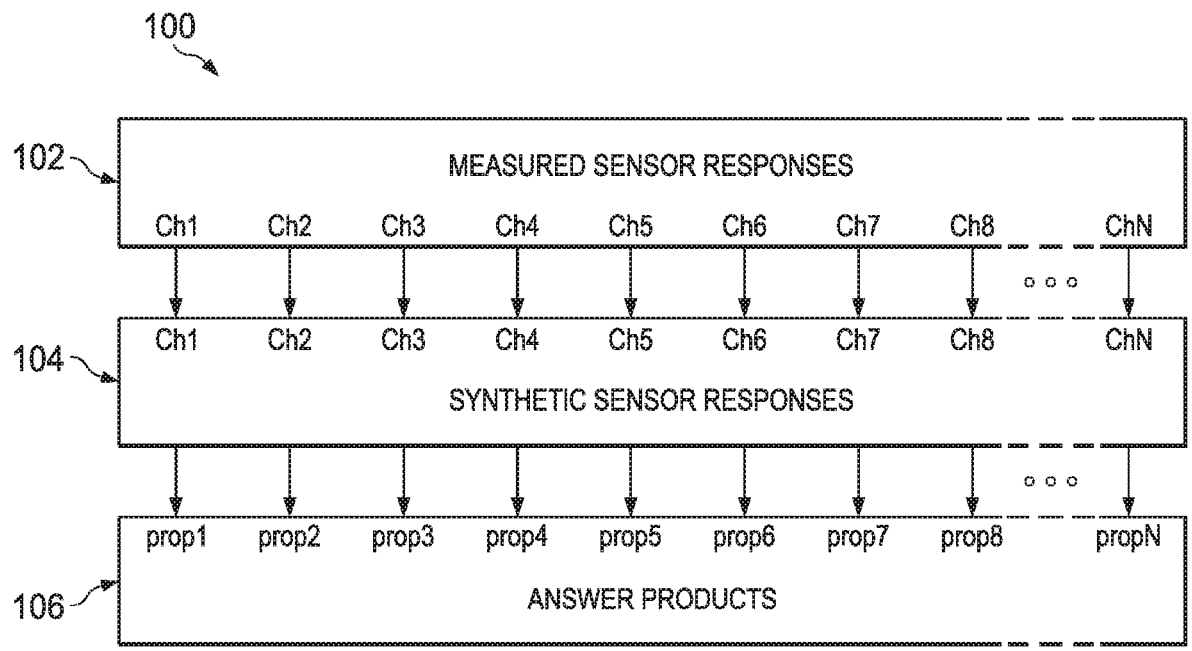
FIGS. 1a illustrates an example data processing workflow for an individual sensor.

Conventional methods of calibrating multivariate models for optical tools include the development of an instrument standardization model and a set of fluid property predictive models for each sensor within the optical tool. The instrument standardization model is a mathematical mapping function that converts multi-channel optical sensor responses from one data space to the other space. The instrument standardization model performs re-scaling functions and is usually calibrated on selected reference fluids at specified temperature and pressure setting points. In contrast, the fluid property prediction models are used to predict multiple fluid properties, such as compositional concentrations of hydrocarbon and other chemical and physical characteristics. The fluid property prediction models may be calibrated on a standard database of global fluid samples using synthetic optical sensor responses as inputs.

The number of samples required for calibrating multivariate models for fluid property predictions are much larger than the number of samples selected for calibrating models for instrument standardization. Additionally, the complexity and cost associated with calibration of fluid property predictive models are much higher than the calibration of instrument standardization models. For example, in a particular application, the optical sensor data obtained from the measurement tool is first processed and mathematically converted with an instrument standardization model. Then, the transformed sensor data is used as standardized inputs for the fluid property prediction models. Once developed, the instrument standardization model may be used for a long period of time before recalibration. Fluid property prediction models, however, may require additional effort to recalibrate the models since the information in the generated synthetic database requires frequent updating. Moreover, as the number of sensors increase, tracing the changes on fluid property prediction models may become an issue if the fluid property prediction model calibration is strictly sensor based.

The disclosed embodiments provide a method for calibrating optical sensors using a cost-effective cross-sensor standardization approach. In some embodiments, a representative sensor is selected to exemplify a cross-section or subgroup of sensors. The representative sensor is selected based on primary optical elements which may be similar or the same as the subgroup of sensors that the representative sensor represents. For example, the representative sensor may include the same design or may originate from similar fabrication batches as the other sensors within the subgroup of sensors. A transformation model maps optical responses of each of the sensors from the subgroup of sensors to the synthetic responses for the respective representative sensor. Synthetic optical responses of the representative sensor are used to generate a single set of fluid property prediction models. The disclosed embodiments includes the calibration of an instrument standardization model for each sensor and fluid property prediction models for the representative sensor, thereby reducing the number of fluid property prediction models that are developed for each optical sensor.

The disclosed embodiments and additional advantages thereof are best understood by referring to FIGS. 1-6 of the drawings, which are appended at the end of this document, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented.

As used herein, the singular forms "a," "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. The embodiments were chosen and described to explain the principles of the invention and the practical application, and to enable others of ordinary skill in the art to understand the claimed inventions.

Generally, one of ordinary skill in the art would recognize that an optical tool may have one or more sensors, due to size limitations or to allow for redundancy. Beginning with FIG. 1a, data processing workflow 100 is an exemplary workflow for an individual sensor that may be part of an optical tool. For example, in some embodiments, an optical tool may be part of a series of tools used in exploration and evaluation of hydrocarbon reservoir fluids. Data processing workflow 100 comprises measured sensor responses 102, synthetic sensor responses 104, and answer products 106. Measured sensor responses 102 are data measured by an optical tool on a particular fluid. Such measurements may be taken in a laboratory or from field formation testing. Measured sensor responses 102 are taken across a number channels (i.e., Ch1 through ChN) at different temperatures and pressures, with each channel output corresponding to a response detected by a particular optical component. For example, one channel may correspond to a narrowband filter. In another example, one channel may correspond with an integrated computation element (also known as an ICE component), an optical component encoded with pre-designed multivariate regression vectors for various properties of interest. An ICE component typically includes a number of optical fabrication batches, or optical layers, consisting of various materials whose index of refraction and size (e.g., thickness) may vary between each fabrication batch. An ICE design refers to the number and thickness of the respective fabrication batches of the ICE component. The fabrication batches may be strategically deposited and sized so as to selectively pass predetermined fractions of electromagnetic radiation at different wavelengths configured to substantially mimic a regression vector corresponding to a particular physical or chemical property of interest of a substance. Accordingly, an ICE design will exhibit a transmission function that is weighted with respect to wavelength. As a result, the output light intensity from the ICE component conveyed to the detector may be related to the physical or chemical property of interest for the substance.

Measured sensor responses 102 are used as the inputs for the instrument standardization model to generate synthetic sensor responses 104. Thus, in this embodiment, the instrument standardization model transforms or converts measured sensor responses 102 to synthetic sensor responses 104. In some embodiments, the transformation is performed channel-by-channel using a single-input and single-output (SISO) linear algorithm. In other embodiments, a multi-input and single-output (MISO) linear standardization algorithm is used to compensate for any cross-talk effect of measured sensor responses 102. In other embodiments, a non-linear algorithm with neural networks is implemented to convert measured sensor responses 102 to synthetic sensor responses 104 through either a MISO configuration or multi-input and multi-output (MIMO) configuration.

As the outputs of the instrument standardization model, synthetic sensor responses 104 are compatible with simulated optical sensor responses in a standard global fluid database and can be used to predict fluid properties directly. In some embodiments, synthetic sensor responses 104 are used to predict hydrocarbon fluid concentrations of methane, ethane, propane, butane and pentane, and other fluid properties with models calibrated on a standard optical fluid database. Synthetic sensor responses 104 are generated under the same channel-by-channel basis as the measured sensor responses 102. In other words, the same pressure and temperature conditions used per channel (i.e., Ch1 through ChN) in measured sensor responses 102 are also applied in developing Ch1 through ChN for synthetic sensor responses 104.

Synthetic sensor responses 104 are then used as the basis for generating predictions of answer products 106 by applying the pre-calibrated fluid property prediction models. The fluid property prediction models can be calibrated on a database partially independent of the actual sensor responses measured on an optical tool. Such a database within a standard optical fluid library may include optical absorption spectra of global fluid samples in the visible to near-infrared (NIR) region, and the chemical and physical properties of the same global fluid samples. The fluid absorption spectra can be converted to the transmittance spectra, and used in conjunction with the sensor system transfer function for a given optical tool to simulate optical sensor responses. The simulated sensor responses on the selected fluid samples from the database can then be used as candidate inputs in calibrating many fluid property predictive models. The calibration outputs of the fluid property predictive models can be known chemical and physical properties of the same corresponding fluid samples. Although each answer product 106 (i.e., prop1 through propN) might be predicted using a particular channel input (i.e., Ch1 through ChN) respectively from synthetic sensor responses 104 through a SISO configuration, a more general approach applies a MISO configuration for each fluid property prediction model. For example, methane concentration of a fluid sample might be predicted with standardized optical response of methane ICE Core channel alone. It can also be predicted with methane ICE Core response plus some other channel responses of narrow-band filters. The set of answer products 106 forms a fluid property prediction model.

Figure 1B:
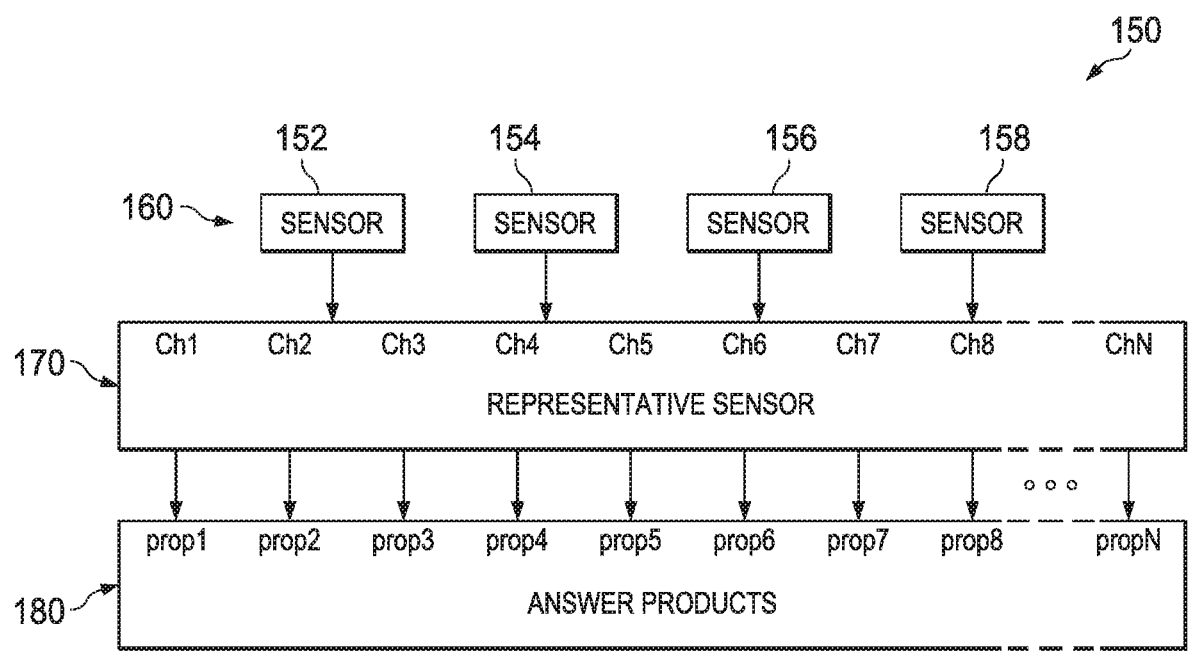
FIG. 1b illustrates an example data processing workflow using multivariate models calibrated using a cross-sensor standardization approach, in accordance with the disclosed embodiments.

Now referring to FIG. 1b, data processing workflow 150 illustrates an example workflow for a downhole fluid optical tool using multivariate models calibrated through cross-sensor standardization, in accordance with the disclosed embodiments. Data processing workflow 150 comprises a group of sensors 160, representative sensors 170, and answer products 180. In some embodiments, each of sensors 152, 154, 156, and 158 within group of sensors 160 may include one or more measured sensor across each of the sensors in measured responses 102 of FIG. 1a. In FIG. 1b, sensors 152 through 158 comprise the same primary optical elements, including, but not limited to, same design and/or fabrication batches. For example, sensors 152 through 158 may comprise narrow band filters with same nominal wavelength and full-width half-maximum (FWHM), and ICE Cores having the same number of physical layers with same nominal film thickness in each layer. In another example, sensor 152 through 158 may originate from the same fabrication batch.

In some embodiments, representative sensor 170 is a synthetic sensor exemplifying or representative of the group of synthetic sensors 160 simulated on the same primary optical elements as sensors 152 through 158. Optical responses of each of sensors 152 through 158 are mapped to responses of representative sensor 170 through a transformation calculation so that each of sensors 152 through 158 may be converted to information operational and readable by representative sensor 170. In some embodiments, the transformation may be calculated by a linear or non-linear algorithm. In some embodiments, a non-linear transformation model, such as a neural network function, can address complex non-linear factors, such as variations in manufacturing optical elements for an optical tool, channel scaling, and cross-talk effect.

In this embodiment, measured sensor responses from group of sensors 160 are used as the basis for calculating synthetic sensor responses for representative sensor 170. Thus, the instrument standardization model for each of sensors 152 through 158 is used as the basis for generating synthetic sensor responses for representative sensor 170. In some embodiments, measured sensor response from group of sensors 160 and synthetic sensor responses from representative sensor 170 may be similar to measured sensor response 102 and synthetic sensor responses 104 respectively of FIG. 1a. In this embodiment, synthetic sensor responses can be generated through either a SISO, or a MISO, or a MIMO configuration. In this embodiment, the number of channels of each optical sensor of group of sensors 160 match the number of channels of representative sensor 170, and the collective synthetic responses from representative sensor 170 forms a complete set of candidate inputs for fluid multi-property prediction models.

It should be noted that, in some embodiments, the synthetic responses of representative sensor 170 may be one of the synthetic responses of sensors 152, 154, 156, and 158. Alternatively, in some embodiments, representative sensor 170 is a hypothetical sensor characterized by the simulated features in the aforementioned process. One of ordinary skill in the art would also recognize that more or less sensors may be included in group of sensors 160, and sensors 152, 154, 156, and 158 may form more groups of sensors similar to group of sensors 160. Furthermore, representative sensor 170 may represent other cross-sections of sensors or subgroups other than sensors 152 through 158 in group of sensors 160.

The standardized optical responses of representative sensor 170 are used as the basis for generating answer products 180. Each answer product 180 (i.e., prop 1 through propN) can be predicted with one or more corresponding optical channel responses (i.e., Ch1 through ChN) respectively for representative sensor 170. For example, if 10 optical sensors are installed on 5 optical tools with each tool having 2 sensors, the 10 sensors can be divided into 2 groups and characterized by 2 representative sensors. Calibration models built on individual sensors, as illustrated by data processing workflow 100 of FIG. 1a, may use a single MIMO instrument standardization model and 15 MISO fluid property prediction models for each sensor. Therefore, the total number of models calibrated with 10 sensors is 160, i.e., 10 instrument standardization models and 150 fluid property prediction models. Using a cross-sensor standardization approach, as illustrated by FIG. 1b, the total number of models is minimized to 40, with 10 instrument standardization models and only 30 fluid property prediction models calibrated on the two representative sensors, thereby reducing the number of fluid property prediction models generated by applying a cross-sensor standardization approach compared to a strict sensor-by-sensor instrument standardization and fluid property prediction calibration model. Since 10 sensors are installed on 5 optical tools, each optical tool may share fluid property prediction models with other tools in field data processing using the cross-sensor standardization approach.

FIGS. 2a and 2b are graphs illustrating calibration pairs across 32 channels of a sensor used to build multivariate models using a cross-sensor standardization approach, in accordance with the disclosed embodiments. With respect to FIG. 2a, graph 200 illustrates the normalized signal intensity 210 for reference fluids across 32 channels in channel index 220. Reference fluids can be any fluid that provides adequate signals in the range of interest and can include water, nitrogen, medium oil, toluene, pentanediol, and dodecane. To calculate the normalized signal intensity 210, the raw signal intensity for each reference fluid is measured from each respective channel first, and then at least one blocked channel on the sensor is selected as a baseline channel. A baseline correction is performed by subtracting the signal intensity of the baseline channel from the signal intensity of each individual channel. The normalized signal intensity 210 calculated at each channel is the ratio of the baseline corrected signal intensity of the respective channel divided by the baseline corrected signal intensity of the neutral-density filter channel. Collectively, the normalized sensor responses form an exemplary and complete set of inputs of an instrument standardization model, an example of what may be used for one of sensors 152 through 158 of FIG. 1b.

Referencing FIG. 2b, graph 250 illustrates the normalized signal intensity 260 for synthetic optical responses on the same referenced fluids used in FIG. 2a. The synthetic optical responses are simulated with the information about the sensor system transfer function across 32 channels in channel index 270 and the transmittance spectra of the reference fluids in a standard optical fluid database. The calculation of synthetic optical response is performed by multiplying the sample transmittance spectra of the reference fluids with the sensor system transfer function measured at the same elevated temperatures and pressures, followed by the baseline correction and neutral-density normalization on each channel, similar to what was described in FIG. 2a, in developing graph 250. Collectively, in some embodiments, the measured optical response on graph 200 and the synthetic optical responses on graph 250 form a set of exemplary matched calibration pairs of inputs and outputs for developing a MIMO standardization model. In some embodiments, for each model calibration with sensors in the selected group, graph 250 will stay the same as the target outputs of the synthetic representative sensor; however, graph 200 may be slightly different as the model inputs may be dependent upon the variation in fabrication of optical components of each sensor. In operation, and discussed further below, after cross-sensor standardization models are developed, actual optical responses of each sensor on new fluids can be fed into its corresponding transformation model to calculate the synthetic representative sensor responses. The standardized responses may then be used as candidate inputs to predict the fluid properties of answer products.

It should be understood by one of ordinary skill in the art that FIGS. 2a and 2b are not limited to the depicted embodiments. FIG. 2a may be generated with different baseline correction and normalization methods, and FIG. 2b may be simulated with different approaches in generating synthetic optical sensor responses. FIGS. 2a and 2b may also include measurements on different fluids and comprise more or less channels than illustrated.

FIGS. 3a and 3b are graphs illustrating the results of applying a cross-sensor standardization model, in accordance with the disclosed embodiments. Regarding FIG. 3a, graph 300 depicts predicted concentration of saturates with use of a conventional standardization model 310 during early phase of data processing, such as a sensor-by-sensor system as described above, compared against saturates prediction using transformed optical data generated with a cross-sensor standardization model 320, as illustrated by data processing workflow 150 of FIG. 1*b*. Predicted saturates concentration 330 illustrates the amount of saturates in grams per cubic centimeter (g/cc) across approximately 800 samples in sample index 340. In the disclosed embodiment, predicted saturates concentration 330 is generated from measurements obtained in the field using a neural network model. In FIG. 3*a*, predicted saturates concentration 330 from cross-sensor standardized inputs 320 compared to conventionally standardized inputs 310 appears relatively close.

FIG. 3*b* shows graph 350 depicting the difference in asphaltenes prediction with transformed optical inputs generated using a conventional sensor standardization model 360, similar data processing workflow 100 of FIG. 1*a*, compared against transformed optical inputs generated using a cross-sensor standardization model 370, like data processing workflow 150 of FIG. 1*b*. Asphaltenes concentration level 380 illustrates the amount of asphaltenes in grams per cubic centimeter (g/cc) across approximately 800 samples in sample index 390. In this example, the asphaltenes prediction is generated from measurements obtained in the field using a neural network model. In FIG. 3*b*, predicted asphaltenes concentration 380 from cross-sensor standardized inputs 370 compared to conventionally standardized inputs 360 appears relatively close.

It should be understood by one of ordinary skill in the art that FIGS. 3*a* and 3*b* are not limited to the depicted embodiments. Similar quality of predictions for other chemical compositions of formation fluids can be obtained using corresponding models with transformed inputs generated from cross-sensor standardization algorithms.

Figure 4:
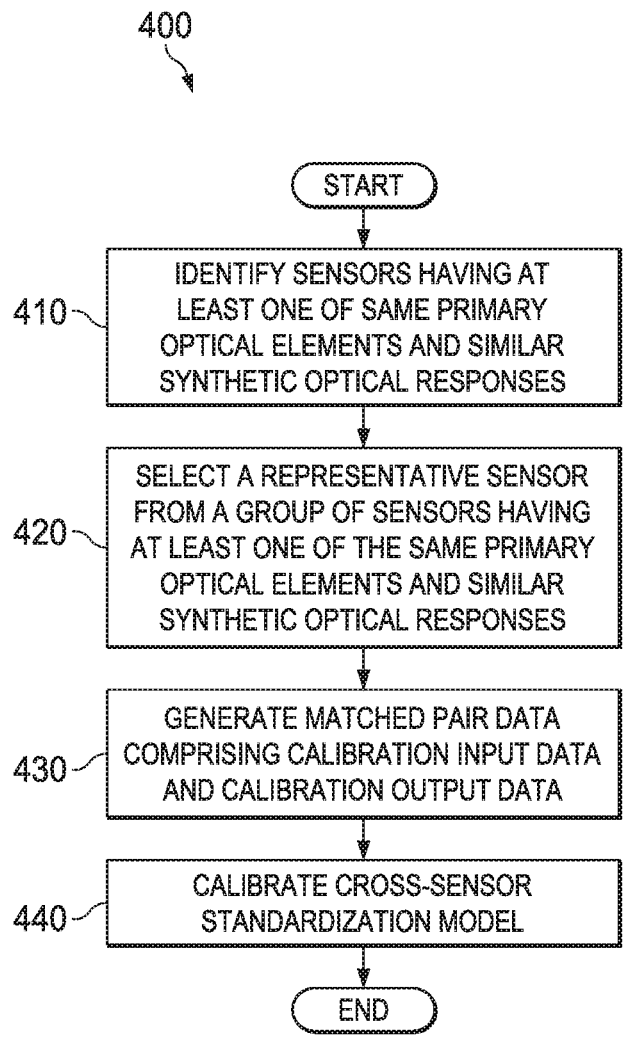
FIG. 4 is a flowchart illustrating an example of a computer implemented method for generating a cross-sensor standardization model, in accordance with the disclosed embodiments.

Referencing FIG. 4, process 400 is a flowchart showing an example of a computer implemented method for generating a cross-sensor standardization model, in accordance with the disclosed embodiments. In general, process 400 begins with step 410 in identifying sensors having at least one of same primary optical elements and similar synthetic optical responses associated with, in some embodiments, the same or similar design or fabrication batch for narrow-band filters and wide-band ICE cores. Process 400 then proceeds to step 420 to select a representative sensor from the group of sensors as identified in step 410. In some embodiments, the representative sensor may be a synthetic sensor simulated from a sensor in the group of sensors, or, in alternative embodiments, the representative sensor may be a hypothetical sensor simulated to minimize a difference between the calculated optical responses of representative sensor and the averaged optical responses over the group of sensors.

In step 430, matched calibration pairs are generated for cross-sensor standardization model development with actual sensor responses as inputs and representative sensor responses as outputs. In some embodiments, the actual sensor responses can be measured under the selected temperature and pressure setting points. In some embodiments, the representative sensor responses can be simulated at the same temperature and pressure setting points if such information is available in a standard database, or generated using two-dimensional interpolation with measured temperatures and pressures associated with actual sensor responses as interpolation inputs. Each cross-sensor standardization model can be calibrated on the same or different number of reference fluids, and the configuration for each cross-sensor standardization model varies depending on whether a SISO, MISO, or MIMO configuration is selected. Process 400 then proceeds to step 440 where the cross-sensor standardization model is calibrated with a linear or non-linear algorithm by using at least one of a SISO, MISO, or MIMO configuration. Process 400 terminates thereafter.

Figure 5:
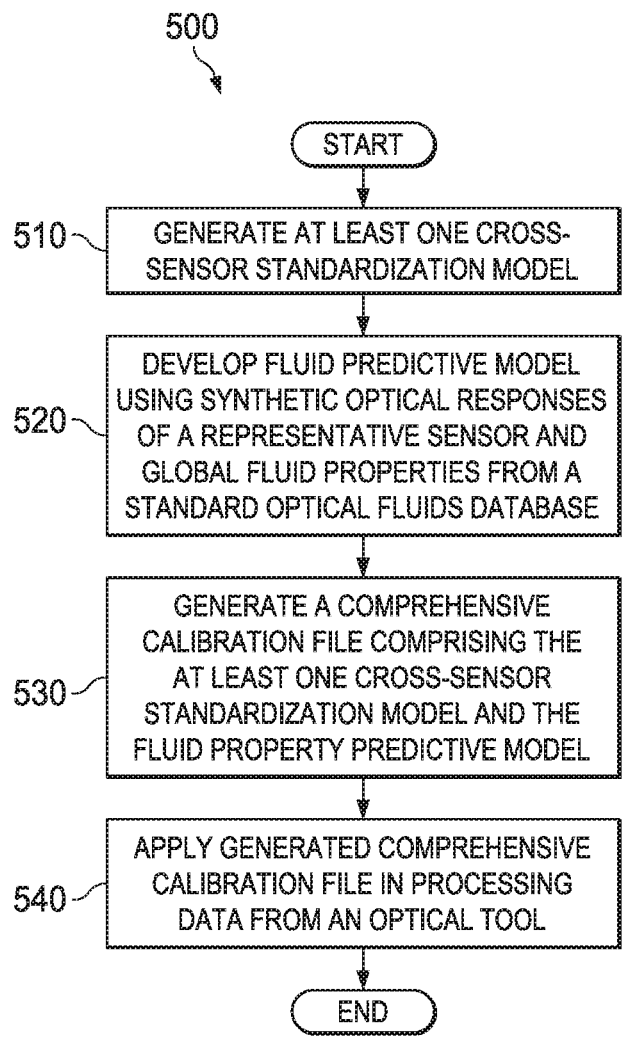
FIG. 5 is a flowchart illustrating an example of a computer implemented method for applying a cross-sensor standardization model and fluid prediction models in processing optical tool measurements, in accordance with the disclosed embodiments.

FIG. 5 is a flowchart illustrating an example of a computer implemented method for applying a cross-sensor standardization model and fluid prediction models in processing optical tool measurements in accordance with the disclosed embodiments. Process 500 begins with step 510 in generating at least one cross-sensor standardization model, where each instrument standardization model is calibrated with data inputs and outputs on at least one reference fluid.

Process 500 then proceeds to step 520 with developing fluid prediction models using the synthetic optical responses of the representative sensors and global fluid properties in a standard optical fluid database. In some embodiments, the fluid prediction models are developed independently from the cross-sensor standardization model after the representative sensors are selected. Cross-sensor standardization models are linear or non-linear functions used to convert or transform actual sensor responses to synthetic sensor responses (i.e., optical to optical mapping). In some embodiments, fluid prediction models are linear or non-linear functions used to calculate primary hydrocarbon concentrations from the synthetic sensor responses (i.e., optical to chemical mapping).

Process 500 then proceeds to step 530 where a comprehensive calibration file is generated comprising the one or more cross-sensor standardization models and fluid property prediction models. In some embodiments, the calibration file is tool dependent, which consists of all coefficient parameters of the two types of models (i.e., cross-sensor standardization model and the fluid property prediction model) organized with specified format. In some embodiments, the calibration file is uploaded into the tool software for field data processing.

Process 500 then proceeds to step 540 so that field data can be processed by applying sensor standardization model first and then followed by applying fluid property prediction models to calculate answer products, as illustrated by FIG. 1*b*. In some embodiments, the data processing is performed using real-time prediction software. In alternative embodiments, the data processing is performed after a job is finished through a post-processing procedure. Process 500 ends thereafter.

Figure 6:
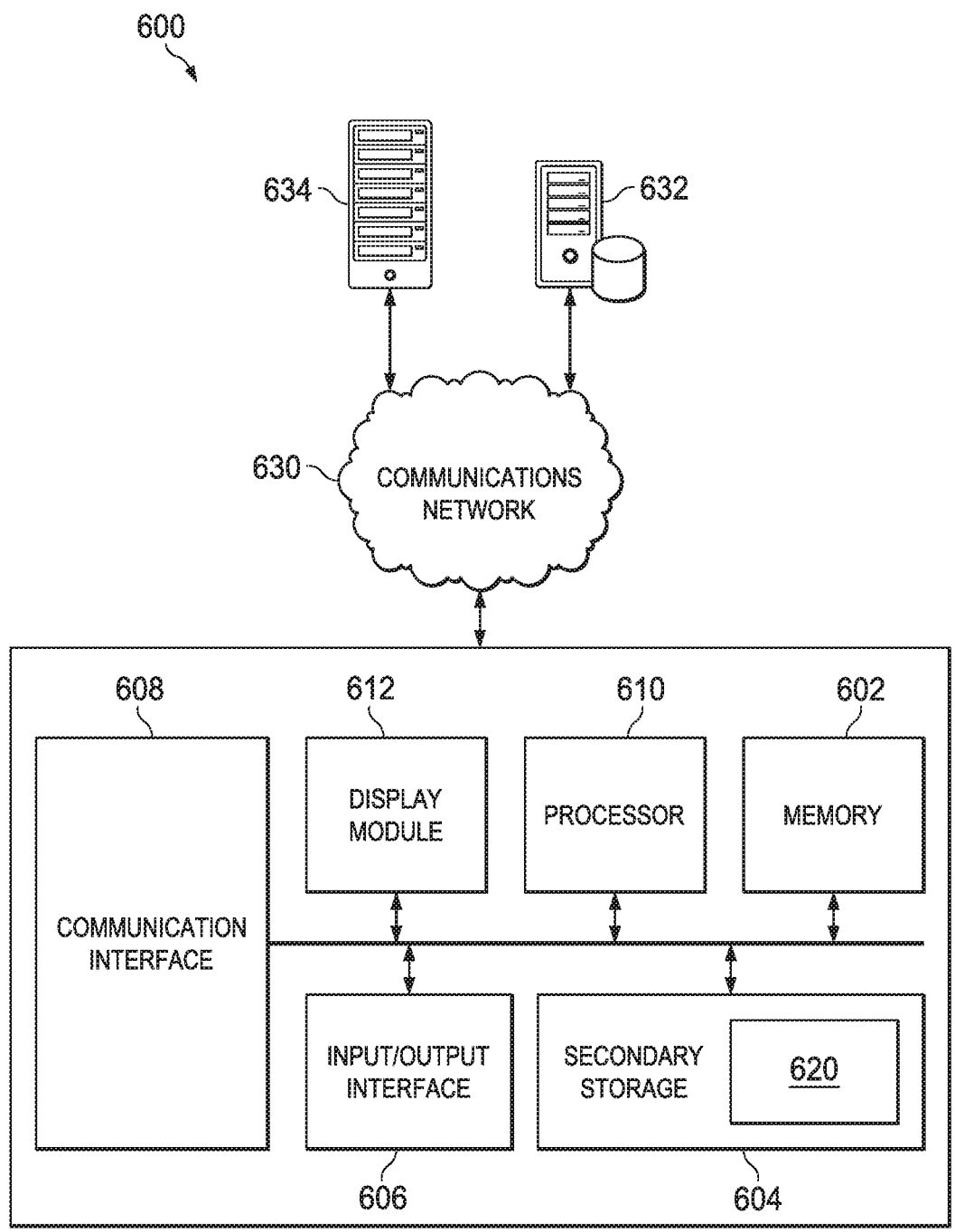
FIG. 6 is a block diagram illustrating one embodiment for implementing the features and functions of the disclosed embodiments.

FIG. 6 is a block diagram illustrating one embodiment of a system 600 for implementing the features and functions of the disclosed embodiments. Generally, in one embodiment, the system 600 includes, among other components, a processor 610, main memory 602, secondary storage unit 604, an input/output interface module 606, and a communication interface module 608. The processor 610 may be any type or any number of single core or multi-core processors capable of executing instructions for performing the features and functions of the disclosed embodiments.

The input/output interface module 606 enables the system 600 to receive user input (e.g., from a keyboard and mouse) and output information to one or more devices such as, but not limited to, printers, external data storage devices, and audio speakers. The system 600 may optionally include a separate display module 612 to enable information to be displayed on an integrated or external display device. For instance, the display module 612 may include instructions or hardware (e.g., a graphics card or chip) for providing enhanced graphics, touchscreen, and/or multi-touch functionalities associated with one or more display devices.

Main memory 602 is volatile memory that stores currently executing instructions/data or instructions/data that are prefetched for execution. The secondary storage unit 604 is non-volatile memory for storing persistent data. The secondary storage unit 604 may be or include any type of data storage component such as a hard drive, a flash drive, or a memory card. In one embodiment, the secondary storage unit 604 stores the computer executable code/instructions and other relevant data for enabling a user to perform the features and functions of the disclosed embodiments.

For example, in accordance with the disclosed embodiments, the secondary storage unit 604 may permanently store the executable code/instructions 620 for performing the above-described generation of a cross-sensor standardization model. The executable code/instructions 620 are then loaded from the secondary storage unit 604 to main memory 602 during execution by the processor 600 for performing the disclosed embodiments.

Additionally, in some embodiments, the system 600 uses the communication interface module 608 to communicate with a communications network 630. For example, the network interface module 608 may include a network interface card and/or a wireless transceiver for enabling the system 600 to send and receive data through the communications network 630 and/or directly with other devices. The communications network 630 may be any type of network including a combination of one or more of the following networks: a wide area network, a local area network, one or more private networks, the Internet, a telephone network such as the public switched telephone network (PSTN), one or more cellular networks, and wireless data networks. The communications network 630 may include a plurality of network nodes (not depicted) such as routers, network access points/gateways, switches, DNS servers, proxy servers, and other network nodes for assisting in routing of data/communications between devices.

In some embodiments, the system 600 may interact with one or more servers 634 or databases 632 (e.g., Landmark's Engineer's Data Model™ database) for performing the features of the present invention. For instance, the system 600 may query the database 632 to retrieve well data in accordance with the disclosed embodiments.

While specific details about the above embodiments have been described, the above hardware and software descriptions are intended merely as example embodiments and are not intended to limit the structure or implementation of the disclosed embodiments. For instance, although many other internal components of the system 600 are not shown, those of ordinary skill in the art will appreciate that such components and their interconnection are well known.

In addition, certain aspects of the disclosed embodiments, as outlined above, may be embodied in software that is executed using one or more processing units/components. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives, optical or magnetic disks, and the like, which may provide storage at any time for the software programming.

Additionally, the flowchart and block diagrams in the figures illustrate the architecture, functionality, and operation of possible implementations of systems, methods and computer program products according to various embodiments of the present invention. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the embodiments described above, many examples of specific combinations are within the scope of the disclosure, some of which are detailed in the below.

Example One

A computer-implemented method for generating a cross-sensor standardization model, the method comprising selecting a representative sensor from a group of sensors comprising at least one of same primary optical elements and similar synthetic optical responses; and calibrating the cross-sensor standardization model based on a matched data pair for each sensor in the group of sensors and for the representative sensor.

Example Two

A computer-implemented method for generating a cross-sensor standardization model, the method comprising selecting a representative sensor from a group of sensors comprising at least one of same primary optical elements and similar synthetic optical responses; calibrating the cross-sensor standardization model based on a matched data pair for each sensor in the group of sensors and for the representative sensor; and generating the matched data pair, wherein the matched data pair comprises calibration input data and calibration output data.

Example Three

A computer-implemented method for generating a cross-sensor standardization model, the method comprising selecting a representative sensor from a group of sensors comprising at least one of same primary optical elements and similar synthetic optical responses; calibrating the cross-sensor standardization model based on a matched data pair for each sensor in the group of sensors and for the representative sensor; and identifying each sensor to form the group of sensors, wherein each sensor comprises at least one of the same primary optical elements and the similar synthetic optical responses.

Example Four

A computer-implemented method for generating a cross-sensor standardization model, the method comprising selecting a representative sensor from a group of sensors comprising at least one of same primary optical elements and similar synthetic optical responses; and calibrating the cross-sensor standardization model based on a matched data pair for each sensor in the group of sensors and for the representative sensor, wherein the same primary optical elements comprises at least one of a same design and a same fabrication batch, and wherein the similar synthetic optical responses comprises similar synthetic optical responses associated with one of similar design and similar fabrication batches.

Example Five

A computer-implemented method for generating a cross-sensor standardization model, the method comprising selecting a representative sensor from a group of sensors comprising at least one of same primary optical elements and similar synthetic optical responses; and calibrating the cross-sensor standardization model based on a matched data pair for each sensor in the group of sensors and for the representative sensor, wherein the representative sensor is a synthetic sensor generated from a sensor in the group of sensors.

Example Six

A computer-implemented method for generating a cross-sensor standardization model, the method comprising selecting a representative sensor from a group of sensors comprising at least one of same primary optical elements and similar synthetic optical responses; and calibrating the cross-sensor standardization model based on a matched data pair for each sensor in the group of sensors and for the representative sensor, wherein the representative sensor is a hypothetical sensor simulated to minimize a difference between calculated optical responses of the representative sensor and averaged optical responses over the group of sensors.

Example Seven

A computer-implemented method for generating a cross-sensor standardization model, the method comprising selecting a representative sensor from a group of sensors comprising at least one of same primary optical elements and similar synthetic optical responses; calibrating the cross-sensor standardization model based on a matched data pair for each sensor in the group of sensors and for the representative sensor; and generating the matched data pair, wherein the matched data pair comprises calibration input data and calibration output data, wherein the step of calibrating the cross-sensor standardization model based on a matched data pair of each sensor in the group of sensors and the representative sensor comprises calibrating the cross-sensor standardization model using one of a single-input single-output configuration, a multi-input single-output configuration, and a multi-input multi-output configuration.

Example Eight

A system comprising at least one processor; at least one memory coupled to the at least one processor and storing instructions that when executed by the at least one processor performs operations comprising selecting a representative sensor from a group of sensors comprising at least one of same primary optical elements and similar synthetic optical responses; and calibrating a cross-sensor standardization model based on a matched data pair for each sensor in the group of sensors and for the representative sensor.

Example Nine

A system comprising at least one processor; at least one memory coupled to the at least one processor and storing instructions that when executed by the at least one processor performs operations comprising selecting a representative sensor from a group of sensors comprising at least one of same primary optical elements and similar synthetic optical responses; and calibrating a cross-sensor standardization model based on a matched data pair for each sensor in the group of sensors and for the representative sensor, wherein at least one memory coupled to the at least one processor and storing instructions that when executed by the at least one processor performs operations further comprises generating the matched data pair, wherein the matched data pair comprises calibration input data and calibration output data.

Example Ten

A system comprising at least one processor; at least one memory coupled to the at least one processor and storing instructions that when executed by the at least one processor performs operations comprising selecting a representative sensor from a group of sensors comprising at least one of same primary optical elements and similar synthetic optical responses; and calibrating a cross-sensor standardization model based on a matched data pair for each sensor in the group of sensors and for the representative sensor, wherein at least one memory coupled to the at least one processor and storing instructions that when executed by the at least one processor performs operations further comprises identifying each sensor to form the group of sensors, wherein each sensor comprises at least one of the same primary optical elements and the similar synthetic optical responses.

Example Eleven

A system comprising at least one processor; at least one memory coupled to the at least one processor and storing instructions that when executed by the at least one processor performs operations comprising selecting a representative sensor from a group of sensors comprising at least one of same primary optical elements and similar synthetic optical responses; and calibrating a cross-sensor standardization model based on a matched data pair for each sensor in the group of sensors and for the representative sensor, wherein the same primary optical elements comprises at least one of a same design and a same fabrication batch, and wherein the similar synthetic optical responses comprises similar synthetic optical responses associated with one of similar design and similar fabrication batches.

Example Twelve

A system comprising at least one processor; at least one memory coupled to the at least one processor and storing instructions that when executed by the at least one processor performs operations comprising selecting a representative sensor from a group of sensors comprising at least one of same primary optical elements and similar synthetic optical responses; and calibrating a cross-sensor standardization model based on a matched data pair for each sensor in the group of sensors and for the representative sensor, wherein the representative sensor is a synthetic sensor generated from a sensor in the group of sensors.

Example Thirteen

A system comprising at least one processor; at least one memory coupled to the at least one processor and storing instructions that when executed by the at least one processor performs operations comprising selecting a representative sensor from a group of sensors comprising at least one of same primary optical elements and similar synthetic optical responses; and calibrating a cross-sensor standardization model based on a matched data pair for each sensor in the group of sensors and for the representative sensor, wherein the representative sensor is a hypothetical sensor simulated to minimize a difference between calculated optical responses of the representative sensor and averaged optical responses over the group of sensors.

Example Fourteen

A system comprising at least one processor; at least one memory coupled to the at least one processor and storing instructions that when executed by the at least one processor performs operations comprising selecting a representative sensor from a group of sensors comprising at least one of same primary optical elements and similar synthetic optical responses; and calibrating a cross-sensor standardization model based on a matched data pair for each sensor in the group of sensors and for the representative sensor, wherein the operations for calibrating the cross-sensor standardization model based on a matched data pair of each sensor in the group of sensors and the representative sensor comprises calibrating the cross-sensor standardization model using one of a single-input single-output configuration, a multi-input single-output configuration, and a multi-input multi-output configuration.

Example Fifteen

A non-transitory computer readable medium comprising computer executable instructions for generating a cross-sensor standardization model, the computer executable instructions when executed causes one or more machines to perform operations comprising selecting a representative sensor from a group of sensors comprising at least one of same primary optical elements and similar synthetic optical responses and calibrating the cross-sensor standardization model based on a matched data pair for each sensor in the group of sensors and for the representative sensor.

Example Sixteen

A non-transitory computer readable medium comprising computer executable instructions for generating a cross-sensor standardization model, the computer executable instructions when executed causes one or more machines to perform operations comprising selecting a representative sensor from a group of sensors comprising at least one of same primary optical elements and similar synthetic optical responses and calibrating the cross-sensor standardization model based on a matched data pair for each sensor in the group of sensors and for the representative sensor, wherein the operations further comprises generating the matched data pair, wherein the matched data pair comprises calibration input data and calibration output data.

Example Seventeen

A non-transitory computer readable medium comprising computer executable instructions for generating a cross-sensor standardization model, the computer executable instructions when executed causes one or more machines to perform operations comprising selecting a representative sensor from a group of sensors comprising at least one of same primary optical elements and similar synthetic optical responses and calibrating the cross-sensor standardization model based on a matched data pair for each sensor in the group of sensors and for the representative sensor, wherein the operations further comprises identifying each sensor to form the group of sensors, wherein each sensor comprises at least one of the same primary optical elements and the similar synthetic optical responses.

Example Eighteen

A non-transitory computer readable medium comprising computer executable instructions for generating a cross-sensor standardization model, the computer executable instructions when executed causes one or more machines to perform operations comprising selecting a representative sensor from a group of sensors comprising at least one of same primary optical elements and similar synthetic optical responses and calibrating the cross-sensor standardization model based on a matched data pair for each sensor in the group of sensors and for the representative sensor, wherein the same primary optical elements comprises at least one of a same design and a same fabrication batch, and wherein the similar synthetic optical responses comprises similar synthetic optical responses associated with one of similar design and similar fabrication batches.

Example Nineteen

A non-transitory computer readable medium comprising computer executable instructions for generating a cross-sensor standardization model, the computer executable instructions when executed causes one or more machines to perform operations comprising selecting a representative sensor from a group of sensors comprising at least one of same primary optical elements and similar synthetic optical responses and calibrating the cross-sensor standardization model based on a matched data pair for each sensor in the group of sensors and for the representative sensor, wherein the representative sensor is a synthetic sensor generated from a sensor in the group of sensors.

Example Twenty

A non-transitory computer readable medium comprising computer executable instructions for generating a cross-sensor standardization model, the computer executable instructions when executed causes one or more machines to perform operations comprising selecting a representative sensor from a group of sensors comprising at least one of same primary optical elements and similar synthetic optical responses and calibrating the cross-sensor standardization model based on a matched data pair for each sensor in the group of sensors and for the representative sensor, wherein the representative sensor is a hypothetical sensor simulated to minimize a difference between calculated optical responses of the representative sensor and averaged optical responses over the group of sensors.

Example Twenty-One

A computer-implemented method of applying a cross-sensor standardization model, the method comprising generating at least one cross-sensor standardization model; developing a fluid predictive model using a synthetic optical response of a representative sensor and global fluid properties from a standard optical fluids database; generating a comprehensive calibration file comprising the at least one cross-sensor standardization model and the fluid property prediction model; and applying generated comprehensive calibration file in processing data from the optical tool.

Example Twenty-Two

A system comprising at least one processor; at least one memory coupled to the at least one processor and storing instructions that when executed by the at least one processor performs operations comprising generating at least one cross-sensor standardization model; developing a fluid predictive model using a synthetic optical response of a representative sensor and global fluid properties from a standard optical fluids database; generating a comprehensive calibration file comprising the at least one cross-sensor standardization model and the fluid property prediction model; and applying generated comprehensive calibration file in processing data from the optical tool.

Example Twenty-Three

A non-transitory computer readable medium comprising computer executable instructions for applying a cross-sensor standardization model, the computer executable instructions when executed causes one or more machines to perform operations comprising generating at least one cross-sensor standardization model; developing a fluid predictive model using a synthetic optical response of a representative sensor and global fluid properties from a standard optical fluids database; generating a comprehensive calibration file comprising the at least one cross-sensor standardization model and the fluid property prediction model; and applying generated comprehensive calibration file in processing data from the optical tool.

While many specific example embodiments are described above, the above examples are not intended to be exhaustive or limit the invention in the form disclosed. Many modifications and variations will be apparent to those of ordinary skill in the art without departing from the scope and spirit of the invention. The scope of the claims is intended to broadly cover the disclosed embodiments and any such modifications.

The invention claimed is:

1. A computer-implemented method for predicting a fluid property, the method comprising:
    identifying a group of sensors, wherein each sensor in the group of sensors comprises a similar sensor element;
    selecting a representative sensor in part based on at least one sensor from the group, wherein the representative sensor exemplifies the group of sensors based on the similar sensor element;
    developing a cross-sensor standardization model for the representative sensor by mapping optical responses from the sensors to the representative sensor;
    mapping an optical response from a measurement by one of the sensors other than the representative sensor to the representative sensor using the cross-sensor standardization model to produce an optical response of the representative sensor; and
    predicting the fluid property from the response of the representative sensor using a fluid property prediction model developed from the representative sensor.

2. The method of claim 1, wherein the response of the representative sensor comprises a synthetic response associated with the similar sensor element.

3. The method of claim 1, wherein the representative sensor is a hypothetical sensor generated from the similar sensor element as the group of sensors.

4. The method of claim 3, wherein mapping an optical response for each sensor to the hypothetical sensor using a cross-sensor standardization model further comprises using a neural network.

5. The method of claim 1, further comprising calculating optical responses of the representative sensor and combining optical responses over the group of sensors, wherein the representative sensor is a hypothetical sensor simulated to minimize a difference between calculated optical responses of the representative sensor and averaged optical responses over the group of sensors.

6. The method of claim 1, further comprising calibrating the cross-sensor standardization model based on a matched data pair of each sensor in the group of sensors and the representative sensor using one of a single-input single-output configuration, a multi-input single-output configuration, or a multi-input multi-output configuration.

7. A system for predicting a fluid property, comprising:
    at least one processor; and
    at least one memory coupled to the at least one processor and storing instructions that when executed by the at least one processor performs operations comprising:
        identifying a group of sensors, wherein each sensor in the group of sensors comprises a similar sensor element;
        selecting a representative sensor in part based on at least one sensor from the group, wherein the representative sensor exemplifies the group of sensors based on the similar sensor element;
    developing a cross-sensor standardization model for the representative sensor by mapping optical response from the sensor to the representative sensor;
    mapping an optical response from a measurement by one of the sensors other than the representative sensor to the representative sensor using the cross-sensor standardization model to produce an optical response of the representative sensor; and
    predicting the fluid property from the response of the representative sensor using a fluid property prediction model developed from the representative sensor.

8. The system of claim 7, wherein the response of the representative sensor comprises a synthetic response associated with the similar sensor element.

9. The system of claim 7, wherein the representative sensor is a hypothetical sensor generated from the similar sensor element as the group of sensors.

10. The system of claim 9, wherein mapping an optical response for each sensor to the hypothetical sensor using a cross-sensor standardization model further comprises using a neural network.

11. The system of claim 7, wherein the operations comprise calculating optical responses of the representative sensor and combining optical responses over the group of sensors, and wherein the representative sensor is a hypothetical sensor simulated to minimize a difference between calculated optical responses of the representative sensor and averaged optical responses over the group of sensors.

12. The system of claim 7, wherein the operations further comprise calibrating the cross-sensor standardization model using one of a single-input single-output configuration, a multi-input single-output configuration, or a multi-input multi-output configuration.

13. A non-transitory computer readable medium comprising computer executable instructions for predicting a fluid property, wherein the computer executable instructions when executed causes one or more machines to perform operations comprising:

identifying a group of sensors, wherein each sensor in the group of sensors comprises a similar sensor element;

selecting a representative sensor in part based on at least one sensor from the group, wherein the representative sensor exemplifies the group of sensors based on the similar sensor element;

developing a cross-sensor standardization model for the representative sensor by mapping optical response from the sensors to the representative sensor;

mapping a response from a measurement by one of the sensors other than the representative sensor to the representative sensor using a cross-sensor standardization model to produce an optical response of the representative sensor; and predicting the fluid property from the response of the representative sensor using a fluid property prediction model developed from the representative sensor.

14. The non-transitory computer readable medium of claim 13, wherein the response of the representative sensor comprises a synthetic response associated with the similar sensor element.

15. The non-transitory computer readable medium of claim 13, wherein the representative sensor is a hypothetical sensor generated from the similar design or the same fabrication batch as the group of sensors.

16. The non-transitory computer readable medium of claim 15, wherein mapping an optical response for each sensor to the hypothetical sensor using a cross-sensor standardization model further comprises using a neural network.

17. The non-transitory computer readable medium of claim 13, wherein the operations comprise calculating optical responses of the representative sensor and combining optical responses over the group of sensors, and wherein the representative sensor is a hypothetical sensor simulated to minimize a difference between calculated optical responses of the representative sensor and averaged optical responses over the group of sensors.

18. The non-transitory computer readable medium of claim 13, wherein the operations further comprise calibrating the cross-sensor standardization model based on a matched data pair of each sensor in the group of sensors and the representative sensor using one of a single-input single-output configuration, a multi-input single-output configuration, or a multi-input multi-output configuration.

* * * * *